(12) United States Patent
Chai (10) Patent No.: US 9,946,376 B2
(45) Date of Patent: Apr. 17, 2018

(54) DISPLAY PANEL AND ELECTRONIC DEVICE

(71) Applicants: Shanghai Tianma Micro-Electronics Co., Ltd., Shanghai (CN); Tianma Micro-Electronics Co., Ltd., Shenzhen (CN)

(72) Inventor: Huiping Chai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 160 days.

(21) Appl. No.: 14/960,215

(22) Filed: Dec. 4, 2015

(65) Prior Publication Data

US 2016/0291382 A1 Oct. 6, 2016

(30) Foreign Application Priority Data

Apr. 1, 2015 (CN) .......................... 2015 1 0153142

(51) Int. Cl.
| | | |
|---|---|---|
| B32B 3/10 | (2006.01) | |
| G06F 3/041 | (2006.01) | |
| G02F 1/1333 | (2006.01) | |

(52) U.S. Cl.
CPC ........ *G06F 3/041* (2013.01); *G02F 1/133308* (2013.01); *G06F 3/0412* (2013.01);
(Continued)

(58) Field of Classification Search
None
See application file for complete search history.

(56) References Cited

U.S. PATENT DOCUMENTS

| | | | |
|---|---|---|---|
| 2009/0310052 A1 | 12/2009 | Huang et al. | |
| 2011/0285640 A1* | 11/2011 | Park .................... | G02F 1/13338 345/173 |

(Continued)

FOREIGN PATENT DOCUMENTS

| | | |
|---|---|---|
| CN | 201097043 Y | 8/2008 |
| CN | 102262313 A | 11/2011 |

(Continued)

OTHER PUBLICATIONS

Chinese Application No. 201510153142.6, Third Office Action dated Mar. 17, 2017.
(Continued)

*Primary Examiner* — Christopher Polley
(74) *Attorney, Agent, or Firm* — Alston & Bird LLP (57) ABSTRACT

A display panel and an electronic device are provided. The display panel includes: a first substrate; a second substrate arranged opposite to the first substrate; a high resistance shielding layer arranged on a side of the first substrate farther away from the second substrate; a conductive film sandwiched between the first substrate and the high resistance shielding layer, the conductive film includes a contact portion contacted with the high resistance shielding layer and an extension portion; a ground pad arranged on a side of the second substrate closer to the first substrate; and a conductive connection portion for electrically connecting the extension portion of the conductive film and the ground pad. The high resistance shielding layer may be contacted closely with the conductive film, and static electricity on the high resistance shielding layer may be conducted to the ground pad via the conductive film and the conductive connection portion.

16 Claims, 6 Drawing Sheets

(52) U.S. Cl.
CPC ............ *G02F 2001/133334* (2013.01); *G06F 2203/04103* (2013.01); *G06F 2203/04107* (2013.01)

(56) References Cited

U.S. PATENT DOCUMENTS

2013/0010216 A1    1/2013    Kang et al.
2016/0266675 A1    9/2016    Yang et al.

FOREIGN PATENT DOCUMENTS

| | | |
|---|---|---|
| CN | 102866800 A | 1/2013 |
| CN | 102999223 A | 3/2013 |
| CN | 103324341 A | 9/2013 |
| CN | 104020906 A | 9/2014 |
| CN | 104216564 A | 12/2014 |
| TW | 201404245 A | 1/2014 |

OTHER PUBLICATIONS

First Office Action as issued in corresponding Chinese Application No. 201510153142.6, dated Jun. 12, 2016.

\* cited by examiner (Prior art)

DISPLAY PANEL AND ELECTRONIC DEVICE

CROSS REFERENCE OF RELATED APPLICATION

The present application claims the priority to Chinese Patent Application No. 201510153142.6, titled "DISPLAY PANEL AND ELECTRONIC DEVICE", filed on Apr. 1, 2015 with the State Intellectual Property Office of the People's Republic of China, the content of which is incorporated herein by reference in its entirety.

FIELD OF INVENTION

The disclosure relates to the technical field of liquid crystal display, and in particular, to a display panel and an electronic device.

BACKGROUND OF THE INVENTION

Touch liquid crystal display in the conventional art generally includes: an upper polarizer, a high resistance shielding layer, a color film substrate, a liquid crystal layer, an array substrate and a lower polarizer. Generally, the high resistance shielding layer is connected to a ground pad (GND Pad) on the array substrate in order to release static electricity on the high resistance shielding layer. According to the conventional art, the high resistance shielding layer is generally connected by silver paste to the ground pad. However, such connection method results in poor reliability and it is difficult to form a good connection between the silver paste and the high resistance shielding layer, thus the static electricity cannot be released completely. Additionally, the silver paste is prone to move onto a surface of the upper polarizer, which causes a surface of the color film substrate to be uneven, thereby affecting the fit effect of a cover lens.

SUMMARY OF THE INVENTION

The technical issue to be addressed by the present disclosure is to provide a display panel and an electronic device, so that static electricity on a high resistance shielding layer can be released sufficiently with an excellent reliability without forming an uneven surface.

A display panel is provided according to an embodiment of the present disclosure. The display panel includes: a first substrate; a second substrate arranged opposite to the first substrate; a high resistance shielding layer arranged on a side of the first substrate farther away from the second substrate; a conductive film sandwiched between the first substrate and the high resistance shielding layer, where the conductive film includes a contact portion contacted with the high resistance shielding layer and an extension portion; a ground pad arranged on a side of the second substrate closer to the first substrate; and a conductive connection portion for electrically connecting the extension portion of the conductive film and the ground pad.

An electronic device is further provided according to an embodiment of the present disclosure, which includes the above display panel.

Compared with the convention art, the present disclosure has the following advantages. In the display panel according to the embodiment, the conductive film is arranged on a surface of the first substrate in contact with the high resistance shielding layer. The high resistance shielding layer may be contacted closely with the conductive film, and static electricity on the high resistance shielding layer may be conducted to the ground pad via the conductive film and the conductive connection portion. Therefore, a good static electricity conduction effect is achieved, and it is avoided that the static electricity on the high resistance shielding layer cannot be transferred completely to the ground pad due to poor contact, and thus the touch and display performance of the panel may not be affected.

BRIEF DESCRIPTION OF THE DRAWINGS

The drawings needed to be used in the description of embodiments or the conventional art are described briefly as follows, so that technical solutions according to the embodiments of the present disclosure or according to the conventional art may become clearer. It is obvious that the drawings in the following description are only some embodiments of the present disclosure. For those skilled in the art, other drawings may be obtained based on these drawings without any creative work.

DETAILED DESCRIPTION OF THE INVENTION

Technical solutions according to embodiments of the present disclosure are described clearly and completely hereinafter in conjunction with the drawings. The described embodiments are only a part rather than all of the embodiments according to the present disclosure. Other embodiments obtained by those skilled in the art based on the embodiments in the present disclosure without any creative work fall into the scope of the present disclosure.

To make the above object, features, and advantages of the present disclosure more apparent and easier to be understood, particular embodiments of the disclosure are illustrated in detail in conjunction with the drawings hereinafter.

For a better understanding of the technique according to the present disclosure by those skilled in the art, a structure of a display panel in the convention art is illustrated by the following.

Figure 1:
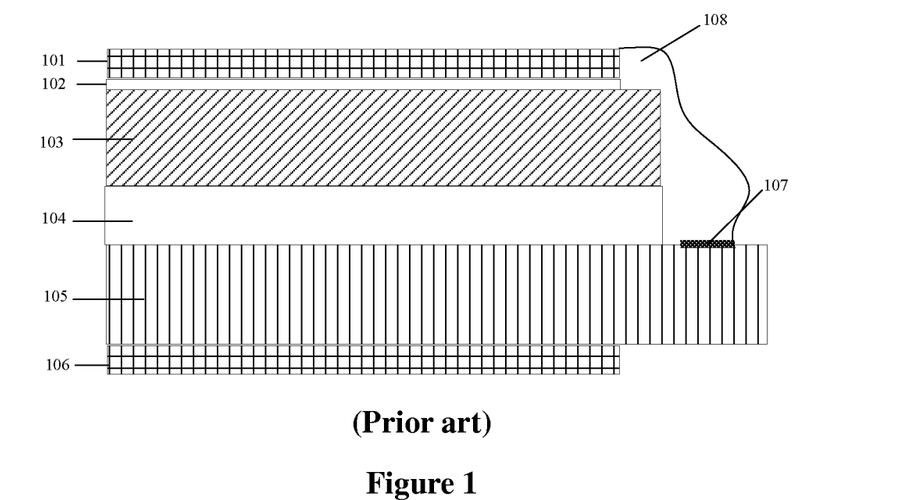
FIG. 1 is a schematic sectional view of a display device in the conventional art.

Referring to FIG. 1, in order to release static electricity on a high resistance shielding layer 102 via a ground pad 107, generally the high resistance shielding layer 102 is connected to the ground pad 107 by silver paste 108, and the static electricity on the high resistance shielding layer 102 is released to the ground pad 107 via the silver paste 108. However, there is an issue in the method for connecting the high resistance shielding layer 102 to the ground pad 107 via the silver paste 108.

After the silver paste 108 is dropped on the ends of an upper polarizer 101 and the high resistance shielding layer 102 closer to the ground pad 107 on a first substrate 103, the silver paste 108 cannot seep into space between an upper polarizer 101 and the high resistance shielding layer 102, that is, the silver paste 108 cannot be well-contacted with the high resistance shielding layer 102, and thus the static electricity on the high resistance shielding layer 102 cannot be released. In another aspect, the silver paste 108 may move onto an upper surface of the upper polarizer 101 in a process of dropping the silver paste 108, which causes a surface of the upper polarizer 101 to be uneven, thereby affecting the fit effect of a cover lens.

Therefore, the solution according to the embodiment of the present disclosure is provided to address the issue in the method as illustrated in FIG. 1.

It should be noted that, the embodiment of the present disclosure is explained with a liquid crystal display (abbreviated as LCD) panel. The solution according to the embodiment of the present disclosure is applied to not only LCD, but also an organic light-emitting diode (abbreviated as OLED) display panels and other types of display devices.

The display panel according to the embodiment of the present disclosure includes: a first substrate, a second substrate arranged opposite to the first substrate, a high resistance shielding layer arranged on a side of the first substrate farther away from the second substrate, a conductive film sandwiched between the first substrate and the high resistance shielding layer, where the conductive film includes a contact portion contacted with the high resistance shielding layer and an extension portion, a ground pad arranged on a side of the second substrate closer to the first substrate, and a conductive connection portion for electrically connecting the extension portion of the conductive film and the ground pad.

Figure 2:
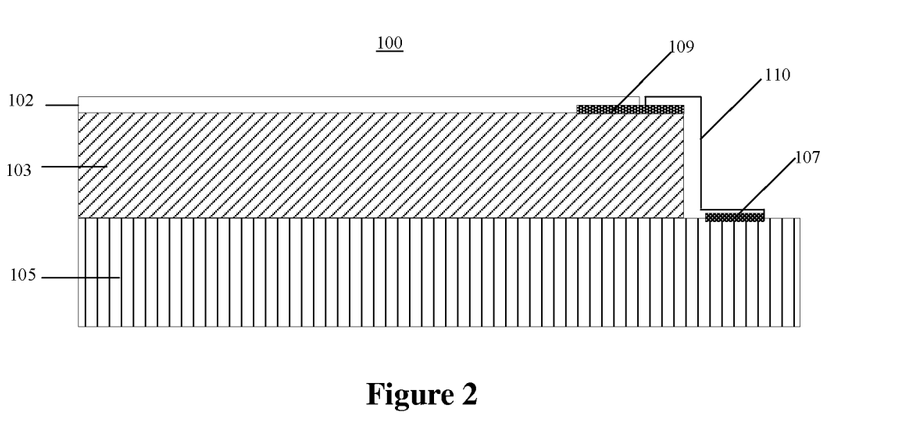
FIG. 2 is a sectional view of an OLED display panel according to the present disclosure.

FIG. 2 is a sectional view of a display panel according to the present disclosure.

A display panel 100 according to an embodiment of the present disclosure includes, a first substrate 103, a second substrate 105 arranged opposite to the first substrate 103, and a high resistance shielding layer 102 arranged on a side of the first substrate 103 farther away from the second substrate 105.

It can be understood that, in the display panel as shown in FIG. 2, the first substrate 103 may be in direct contact with the second substrate 105, or there may be a layer of a substance between the first substrate 103 and the second substrate 105, such as a liquid crystal layer. The side of the first substrate 103 farther away from the second substrate 105 is an upper surface of the first substrate 103. That is, the high resistance shielding layer 102 is arranged on the upper substrate of the first substrate 103.

It can be understood that the position relationship of upper and lower is relative. In one embodiment, the first substrate 103 is arranged below the second substrate 105 and the high resistance shielding layer is place below first substrate 103, which also falls into the scope of protection of the embodiment of the disclosure.

The conductive film 109 is arranged between the first substrate 103 and the high resistance shielding layer 102. The conductive film 109 includes a contact portion contacted with the high resistance shielding layer 102 and an extension portion.

The ground pad 107 is arranged on a side of the second substrate 105 closer to the first substrate 103. It should be noted that, the ground pad 107 being arranged on a side of the second substrate 105 closer to the first substrate 103 means that the ground pad 107 is arranged on the upper surface of the second substrate 105 in the case that the first substrate 103 is arranged above the second substrate 105 (as shown in FIG. 2).

The conductive connection portion 110 is used for electrically connecting the extension portion of the conductive film 109 and the ground pad 107.

It should be noted that, the conductive film 109 may be well-contacted with the high resistance shielding layer 102, the extension portion of the conductive film 109 may be well-contacted with the conductive connection portion 110, and static electricity on the high resistance shielding layer 102 may be transferred to the ground pad 107 via the conductive film 109 and the conductive connection portion 110.

It should be noted that the first substrate 103 may be a color filter (abbreviated as CF) substrate, and the second substrate 105 may be an array substrate.

It can be understood that the conductive connection portion 110 may be made of a conductive material. For example, the conductive connection portion 110 may be made of a conductive tape and the like.

A material of the conductive film 109 is not limited in the embodiment, which may be selected depending on actual cases, from the following materials but not limited to these: indium tin oxide ITO, silver paste, nano-silver and graphene.

In the display panel according to an embodiment, the conductive film is arranged on a surface of the first substrate in contact with the high resistance shielding layer. The high resistance shielding layer may be in contact with the conductive film, and static electricity on the high resistance shielding layer may be conducted to the ground pad via the conductive film and the conductive connection portion. Therefore, a good static electricity conduction effect is achieved, and prevents a lack of static electricity transfer from the high resistance shielding layer to the ground pad due to poor contact. Thus the touch and display performance of the panel may not be affected.

FIG. 2 illustrates an embodiment where there is no liquid crystal layer between the first substrate 103 and the second substrate 105, which is the configuration for an OLDED display panel. Also, the solution according to embodiments of the instant invention can be applied to an LCD display panel.

Figure 3:
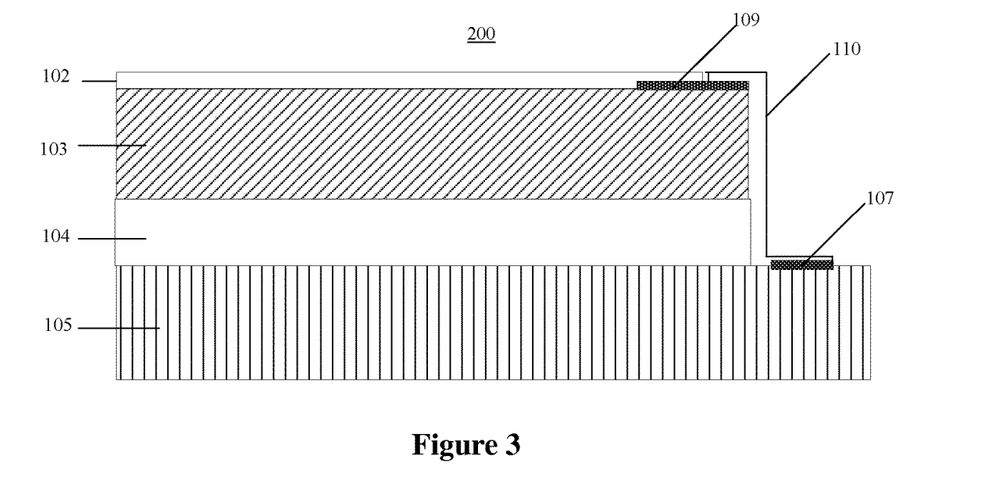
FIG. 3 is a sectional view of an LCD display panel according to the present disclosure.

FIG. 3 shows a sectional view of an LCD display panel. As shown in FIG. 3, a liquid crystal layer 104 is added between the first substrate 103 and the second substrate 105 in the display panel 200.

Figure 4A:
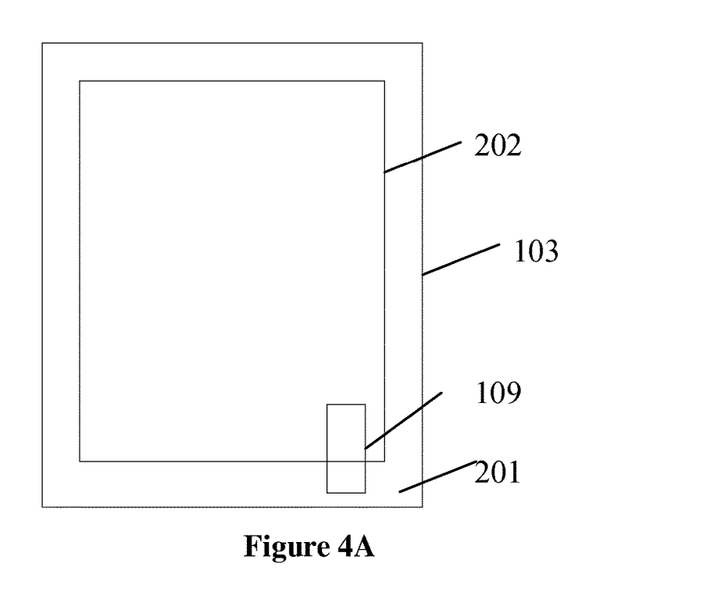
FIG. 4A is a top view of a first substrate of a display panel according to the present disclosure.

A display panel is further provided according to an embodiment of the present disclosure. The display panel may include a first substrate 103, and a conductive film 109 which is made of a transparent material and is arranged in a border area 201 and a display area 202 of the first substrate 103, as shown in FIG. 4A. It can be understood that the conductive film may be arranged in only the border area 201 in the case that the conductive film is made of the transparent material.

Figure 4B:
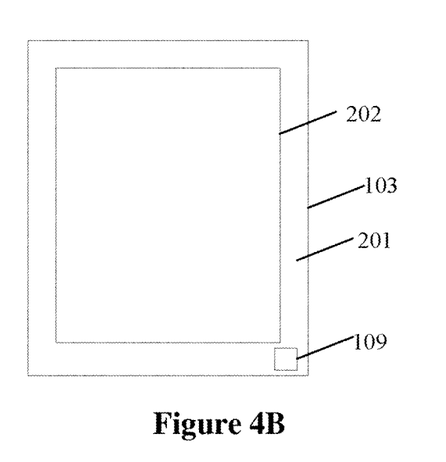
FIG. 4B is a top view of another first substrate of a display panel according to the present disclosure.

A display panel may further be provided according to another embodiment of the present disclosure, and the display panel includes a first substrate 103. FIG. 4B is a top view of the first substrate of the display panel according to the present disclosure. As shown in FIG. 4B, the conductive film 109 is made of an opaque material and is arranged in the border area 201 of the first substrate 103.

Figure 5A:
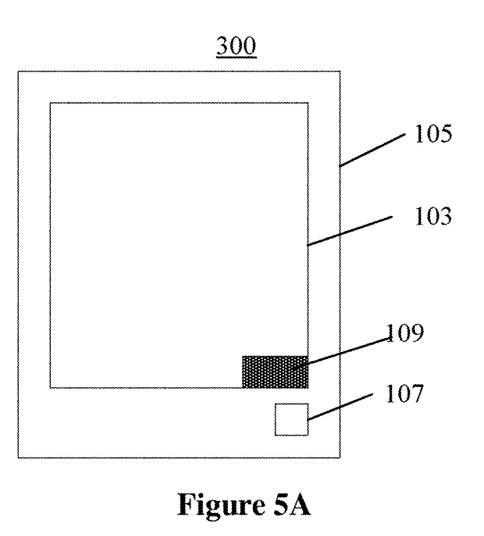
FIG. 5A is a top view of a display panel according to the present disclosure.

FIG. 5A illustrates display panel 300. The conductive film 109 is arranged on an end of the first substrate 103 closer to the ground pad 107. As can be seen from FIG. 5A, the ground pad 107 is arranged in a border area of the second substrate 105. It can be understood that a conductive connection portion 110 may be omitted in the case that the conductive film 109 is arranged on the end of the first substrate 103 closer to the ground pad 107.

The conductive film 109 may be arranged at other position on the first substrate 103, without considering whether the conductive connection portion 110 is omitted. Specifically, the conductive film 109 may be formed in various ways, such as a coating process or a silk-screen printing process.

It should be noted that an area of the conductive film 109 and an area of the ground pad 107 are not limited in the embodiment. For example, the area of the conductive film 109 may be larger or smaller than the area of the ground pad 107

In addition, the display panel according to an embodiment of the present invention further includes a polarizer which is integrated with a high resistance shielding layer. For example, the polarizer may be integrated with a high resistance shielding layer during fabrication.

Furthermore, the high resistance shielding layer is integrated on a side of the polarizer closer to the first substrate.

Figure 5B:
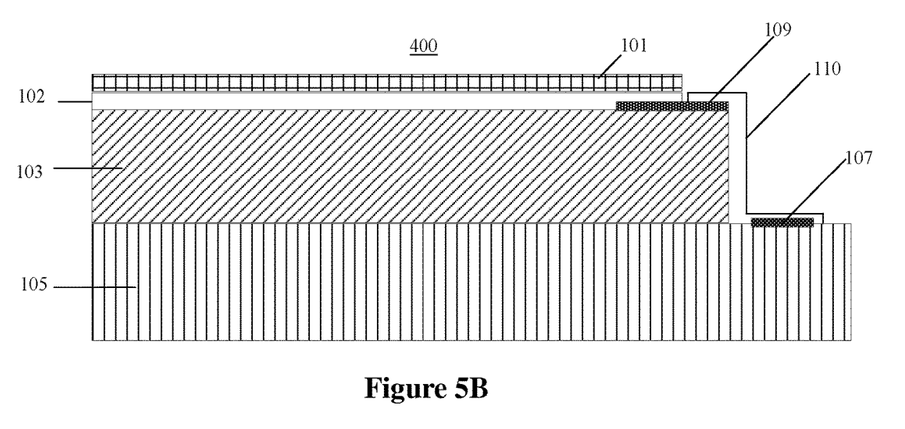
FIG. 5B is a sectional view of a display panel according to the present disclosure.

In addition, ends of the high resistance shielding layer are aligned with ends of the polarizer, respectively. Generally, the high resistance shielding layer is integrated with the polarizer. In display panel 400 as shown in FIG. 5B, the ends of the high resistance shielding layer 102 are aligned with the ends of the polarizer 101, respectively. In the case that the high resistance shielding layer and the ground pad are connected via silver paste according to the conventional art, it is difficult for the silver paste to enter into space between the high resistance shielding layer 102 and the first substrate 103. In other words, the silver paste cannot be well-contacted with the high resistance shielding layer, and thus static electricity on the high resistance shielding layer cannot be transferred efficiently to the ground pad to be released. Therefore, a conductive film is added according to an embodiment of the present invention. Thus the above issue may be addressed, thereby efficiently releasing the static electricity on the high resistance shielding layer to the ground pad.

It should be noted that the high resistance shielding layer may transfer the static electricity to prevent the display panel from suffering an electrostatic damage. The high resistance shielding layer may also pass a touch signal, yet have no effect on touch detection.

It can be understood that an electrostatic signal is a low frequency signal, and a touch signal is a high frequency signal. Therefore, the high resistance shielding layer is used to block low frequency signals and pass high frequency signals, without affecting normal touch detection.

In addition, the conduction film 109 may be in a regular shape or in an irregular shape. The shape may be selected depending on the convenience of technological operation and the saving of processes or costs.

For example, the conductive film 109 is in a regular shape of a strip, a block, a ring or a circle.

Figure 6:
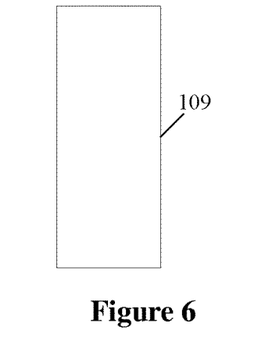
FIG. 6 is a schematic diagram of a conductive film of a display panel according to the present disclosure.
Figure 7:
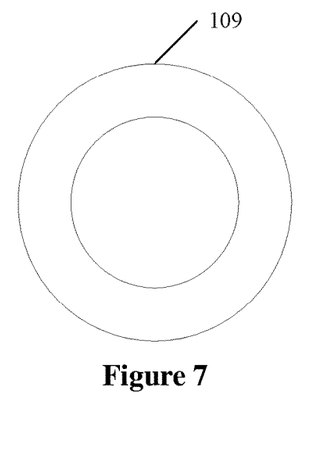
FIG. 7 is a schematic diagram of another conductive film of a display panel according to the present disclosure.
Figure 8:
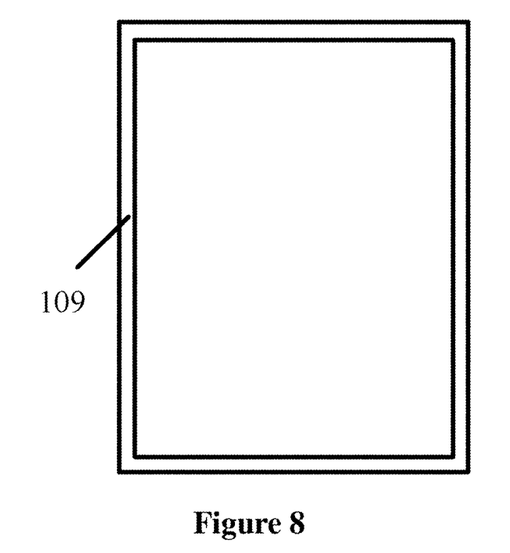
FIG. 8 is a schematic diagram of still another conductive film of a display panel according to the present disclosure.
Figure 9:
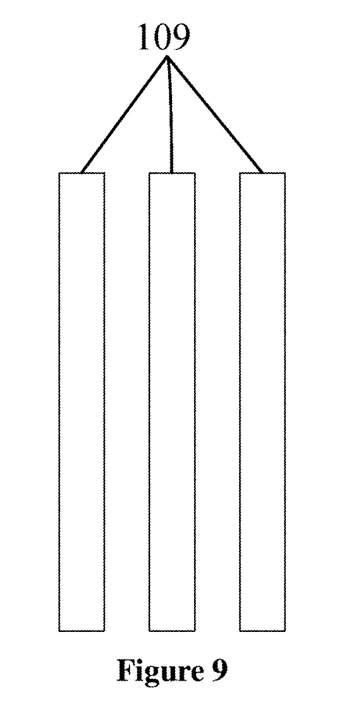
FIG. 9 is a schematic diagram of yet another conductive film of a display panel according to the present disclosure.

As shown in FIG. 6, the conductive film 109 may be in a regular shape of a strip. As shown in FIG. 7, the conductive film 109 may be in a regular shape of a ring. As shown in FIG. 8, the conductive film 109 may be in a regular shape of a circle. As shown in FIG. 9, the conductive film 109 may be in an irregular shape.

Figure 10:
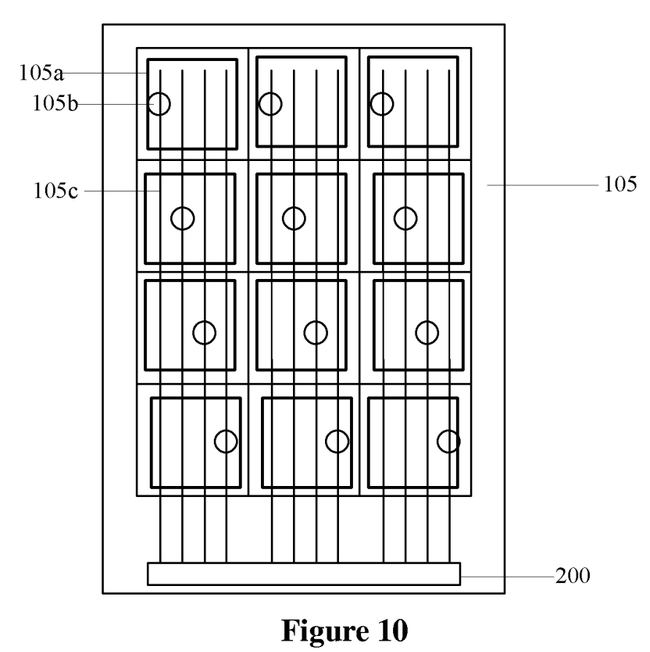
FIG. 10 is a top view of a second substrate of a display panel according to the present disclosure.

Referring to FIG. 10, FIG. 10 is a top view of a second substrate of a display panel according to the present disclosure. FIG. 10 illustrates, a second substrate 105, which may include multiple touch electrodes 105a arranged in an array. It can be understood that any two adjacent touch electrodes 105a are insulated from each other. A common voltage is applied to the touch electrode 105a in a display stage and a touch driving detection signal is applied to the touch electrode 105a in a touch stage.

It should be noted that the touch driving detection signal is output by an IC (Integrated Circuit) 200 which may be a touch IC or a touch display integrated IC.

The second substrate 105 further includes multiple touch lines 105c, and each of the touch lines 105c is electrically connected to a corresponding touch electrode 105a.

As shown in FIG. 10, the touch electrodes 105a are electrically connected to the touch lines 105c through via holes 105b in the case that the touch electrodes 105a are not arranged in the same layer with the touch lines 105c.

It should be noted that the touch electrode and the common electrode may be arranged separately, or may be arranged as one electrode serving as the common electrode and the touch electrode.

Figure 11:
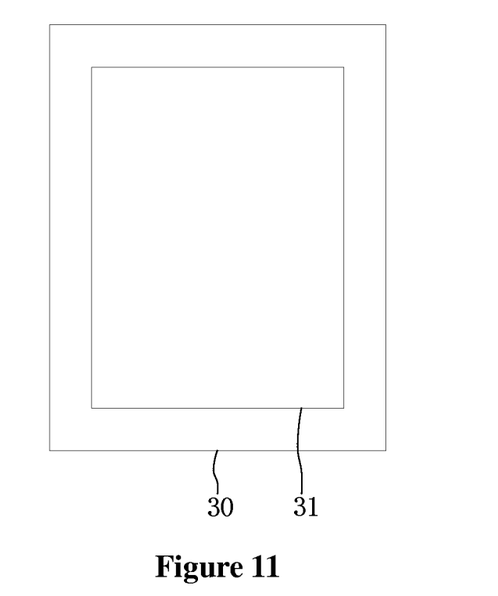
FIG. 11 is a schematic diagram of an electronic device according to the present disclosure.

An electronic device is further provided according to an embodiment of the present disclosure, and reference is made to FIG. 11. The electronic device according to the embodiment depicted in FIG. 11 includes the display panel according to any one of the above embodiments. The electronic device 30 includes a display panel 31, and may include a driver circuit and other components for supporting the electronic device 30 to operate normally.

The display panel 31 is the display panel according to the above embodiments. The above electronic device 30 may be one of a mobile phone, a desktop computer, a notebook computer, a tablet computer and an electronic paper.

What is described above is only preferred embodiments of the present disclosure and is not intended to limit the present disclosure in any way. The preferred embodiments of the present disclosure are disclosed above, which should not be interpreted as limiting the present disclosure. Numerous alternations, modifications, and equivalents can be made to the technical solutions of the present disclosure by those skilled in the art in light of the methods and technical content disclosed herein without deviation from the scope of the present disclosure. Therefore, any alternations, modifications, and equivalents made to the embodiments above according to the technical essential of the present disclosure without deviation from the scope of the present disclosure should fall within the scope of protection of the present disclosure.

The invention claimed is:
1. A display panel, comprising:
   a first substrate;
   a second substrate arranged opposite to the first substrate, wherein the first substrate and the second substrate have at least two sides;

wherein the second substrate comprises a plurality of touch electrodes, and the plurality of touch electrodes are insulated from each other and arranged in a same layer to form an array;
a plurality of touch lines, each connecting to one of the plurality of touch electrodes respectively;
a high resistance shielding layer arranged on a side of the first substrate located farther away from the second substrate;
a conductive film arranged in-between the first substrate and the high resistance shielding layer, wherein the conductive film comprises a contact portion in contact with the high resistance shielding layer and an extension portion; wherein the conductive film is in a rectangular shape;
wherein the first substrate comprises a display area and a border area, wherein the border area comprises the conductive film;
a ground pad arranged on a side of the second substrate located closer to the first substrate; and
a conductive connection portion for electrically connecting the extension portion of the conductive film and the ground pad.

2. The display panel according to claim 1, wherein the conductive film is made of a transparent material.

3. The display panel according to claim 1, wherein the conductive film is made of an opaque material.

4. The display panel according to claim 1, wherein the conductive film is arranged on an end of the first substrate closer to the ground pad.

5. The display panel according to claim 1, wherein the conductive film is formed by a coating process.

6. The display panel according to claim 1, wherein the conductive film is formed by means of a silk-screen printing process.

7. The display panel according to claim 1, wherein a material of the conductive film is selected from the group comprising:
indium tin oxide ITO, silver paste, nano silver and graphene.

8. The display panel according to claim 1, further comprising a polarizer, wherein the polarizer is integrated with the high resistance shielding layer, and the high resistance shielding layer is integrated on a side of the polarizer closer to the first substrate.

9. The display panel according to claim 8, wherein ends of the high resistance shielding layer are aligned with ends of the polarizer respectively.

10. An electronic device, comprising a display panel, wherein the display panel comprises:
a first substrate;
a second substrate arranged opposite to the first substrate, wherein the first and substrate have at least two sides;
wherein the second substrate comprises a plurality of touch electrodes, and the plurality of touch electrodes are insulated from each other and arranged in a same layer to form an array;
a plurality of touch lines, each connecting to one of the plurality of touch electrodes respectively;
a high resistance shielding layer arranged on a side of the first substrate located farther away from the second substrate;
a conductive film sandwiched between the first substrate and the high resistance shielding layer, wherein the conductive film comprises a contact portion contacted with the high resistance shielding layer and an extension portion; wherein the conductive film is in a rectangular shape;
wherein the first substrate comprises a display area and a border area, wherein the border area comprises the conductive film;
a ground pad arranged on a side of the second substrate located closer to the first substrate; and
a conductive connection portion for electrically connecting the extension portion of the conductive film and the ground pad.

11. The electronic device according to claim 10, wherein the conductive film is made of a transparent material.

12. The electronic device according to claim 10, wherein the conductive film is made of an opaque material.

13. The electronic device according to claim 10, wherein the conductive film is arranged on an end of the first substrate located closer to the ground pad.

14. The electronic device according to claim 10, wherein the conductive film is formed by means of a coating process.

15. The electronic device according to claim 10, wherein the conductive film is formed by a silk-screen printing process.

16. The electronic device according to claim 10, wherein a material of the conductive film is selected from the group comprising: indium tin oxide ITO, silver paste, nano silver and graphene.

* * * * *